Patented June 7, 1932

1,861,514

UNITED STATES PATENT OFFICE

LORENZO D. TAYLOR, OF LEWISTON, NEW YORK, ASSIGNOR TO THE MATHIESON ALKALI WORKS, INC., OF NEW YORK, N. Y., A CORPORATION OF VIRGINIA

CHEMICAL MANUFACTURE

No Drawing. Application filed March 20, 1931. Serial No. 524,211.

This invention relates to the treatment of oils and is concerned more particularly with a novel method by which the drying time of drying oils, such as tung oil and the like, may be materially decreased, and drying qualities imparted to oils of a non-drying or semi-drying character, such as soya bean oil and the like.

I have discovered that the desired results can be obtained when the oils are treated under proper conditions with dry calcium hypochlorite containing upwards of 50%, and preferably upwards of 60% available chlorine.

The calcium hypochlorite products, high in available chlorine, the production of which is described in an application filed August 16, 1928, Serial Number 300,148, by Robert MacMullin and Maurice C. Taylor, are particularly useful in carrying out my invenvention. These products are distinguished from ordinary bleaching powder or chlorinated lime not only by their high available chlorine content but also by their chemical constitution. It is probable that the advantages of my invention are to some extent secured by the use of calcium hypochlorite having the chemical constitution of these products as distinguished from bleaching powder or chlorinated lime.

According to my invention, finely divided calcium hypochlorite containing aproximately 60% available chlorine is mixed with the oil to be treated at room temperature, and the mixture is agitated and heated to a temperature of 60°–75° C., and the agitation and heating at the desired temperature continuously maintained for a period of five or six hours. Thereafter the residual sludge may be removed in any convenient manner, as by filtering or settling. The amount of calcium hypochlorite powder employed may vary from 0.25% to approximately 2.5% with a preferred amount of 1.4% to 1.6% by weight on the oil. An increase of the amount of calcium hypochlorite from 0.25% to about 1.6% produces a steady decrease in the drying time and, while amounts much in excess of 1.6% tend to increase the drying time, amounts up to this upper limit shorten the time of drying.

When drying oils are subjected to the treatment described, their drying times are materially decreased. In the case of non-drying oils, the treatment described is in itself not ordinarily sufficient to accomplish the desired purpose, but when such oils are thus treated and then mixed with varying amounts of tung oil, similarly treated, the mixture dries in relatively short periods, which depend to some extent, on the amount of treated tung oil added.

The calcium hypochlorite is advantageously employed in the form of a dry powder, containing for example less than 1% of water, or in the form of a powder containing but a small amount of water, for example less than 5–6%. Moisture content exceeding about 6% tends to involve an increase in the drying time.

The following may be given as examples of the application of my invention to various drying oils:

Raw linseed oil

I. Twenty cc. of raw linseed oil, 1 cc. of which would not dry in two weeks when exposed to the air in a 7 mm. Petri dish, were introduced into a flask with 300 mg. of dry calcium hypochlorite powder containing approximately 60% available chlorine. The oil was then raised to a temperature of 75° C. by means of a hot water bath and kept at the specified temperature for a period of five hours, during which the oil was continuously agitated mechanically. After filtration, 1 cc. of the oil exposed to the air in a 7 mm. Petri dish dried in thirty-six hours to an extent such that no tackiness could be detected by touching the oil with the finger.

Tung or China-wood oil

II. When tung or China-wood oil was treated in the manner described in the first example, the oil had dried to the point that no tackiness could be detected at the end of twelve hours.

Fish oil

III. Fish oil treated in the manner described in the first example showed a marked decrease in drying time.

While in the examples above given, the addition of 1.4-1.6% of calcium hypochlorite powder containing approximately 60% available chlorine to the oil produced the optimum results, the ratio of hypochlorite to oil may be varied considerably above and below the specified range and oils obtained which show a great improvement in drying time over the untreated products.

In the case of non-drying and semi-drying oils, I first prepare a quantity of tung oil by treating it with from 1.4 to 1.6% of dry calcium hypochlorite powder at a maintained temperature of 70° C. with continuously maintained agitation for a period of five or six hours. The oil is then filtered and added to other oils, as described in the examples below.

Soya bean oil

IV. Soya bean oil was treated with about 1.5% of calcium hypochlorite containing approximately 60% available chlorine at 70° C. for five hours with continuous agitation. The oil was then filtered and a quantity of the treated tung oil added thereto. The addition of 10% by volume of treated tung oil to the treated soya bean oil produced a mixture drying in thirty-six hours. The addition of 20% by volume of treated tung oil caused the drying to occur in twenty hours.

Cottonseed oil

V. A mixture of cottonseed oil treated in the same manner as the soya bean oil with additions of treated tung oil in amounts of 10%, 20%, and 30% by volume was found to dry in approximately fifteen hours.

Corn oil

VI. A mixture of corn or maize oil treated as described in the fourth example with additions of 10%, 20%, 30%, 40% and 50% by volume of treated tung oil dried in twenty-four to thirty-six hours.

Peanut oil

VII. Peanut oil was treated in the manner described in the fourth example and then additions of treated tung oil amounting to 10%, 20% and 30% by volume were added. The mixture including 10% of tung oil dried in forty-eight hours. The mixtures including 20% and 30% of tung oil dried in about twelve hours.

In connection with the addition of treated tung oil to other oils, I have observed that while in general an increase in the amount of tung oil added reduces the drying time, the addition of too great amounts of tung oil may result in the production of a film which is slightly crystalline and is not limpid as in the case where lesser amounts of tung oil are employed. For example, in the case of soya bean oil, additions of 10% and 20% by volume of tung oil gave clear unchecked films whereas higher percentages resulted in films of crystalline appearance. Similarly, in the case of cottonseed oil, the addition of 30% by volume of tung oil brought about drying in sixteen hours, but the film resulting was not as smooth as that produced in the case of additions of 10% and 20% of tung oil. In the case of corn oil, as much as 50% of treated tung oil by volume could be added and a clear smooth film obtained, but percentages above 50% produced the crystalline film mentioned.

In the case of fish oil, I have found that the drying time of the oil was substantially improved by treatment with calcium hypochlorite in the amount and under the conditions described and still better results were obtained when quantities of treated tung oil were added thereto. Similarly linseed oil treated with calcium hypochlorite as described was found to have an improved drying time and the results obtained were considerably better when quantities of treated tung oil not exceeding 30% by volume were added thereto. Linseed oil treated under the conditions described with about 1.5% of calcium hypochlorite containing approximately 60% available chlorine dried in about thirty-six hours, while treated linseed oil combined with 10% to 30% by volume of treated tung oil dried in twelve to fourteen hours. When percentages above 30% of tung oil were employed, the film became crystalline.

This invention is a further development of the methods set forth and described in my prior application Serial Number 490,543, filed October 22, 1930.

What I claim:

1. In the treatment of oils of the kinds described, the steps of mixing dry calcium hypochlorite containing approximately 60% available chlorine with the oil, and maintaining the temperature of the mixture at upwards of approximately 60° C. for a period of approximately five to six hours.

2. In the treatment of oils of the kinds described, the steps of mixing dry calcium hypochlorite containing approximately 60% available chlorine with the oil, maintaining the temperature of the mixture at upwards of approximately 60° C. for a period of approximately five to six hours, and agitating the mixture throughout the period of heating.

3. In the treatment of oils of the kinds described, the steps of adding dry calcium hypochlorite containing approximately 60% available chlorine to the oil in the amount of about 0.25% to 2.5% by weight of the oil, and maintaining the mixture at a temperature of upwards of approximately 60° C. for a period of about five to six hours.

4. In the treatment of oils of the kinds described, the steps of adding to the oil from about 1.4% to about 1.6% by weight of dry calcium hypochlorite containing approximately 60% of available chlorine, maintaining the mixture at a temperature of upwards of 60° C. for a period of about five to six hours, and agitating the mixture throughout the period of heating.

5. In the treatment of oils of the kinds described, the steps of mixing dry hypochlorite containing approximately 60% of available chlorine with the oil, maintaining the mixture at a temperature of 70° to 75° C. for a period of about five to six hours, and agitating the mixture throughout the period of heating.

6. In the treatment of semi-drying and non-drying oils of the kinds described, the steps mixing dry calcium hypochlorite containing approximately 60% of available chlorine with the oil, maintaining the mixture at a temperature of upwards of 60° C. for a period of approximately five to six hours, and adding to the treated oil smaller quantities of tung oil treated in substantially the same manner.

7. In the treatment of semi-drying and non-drying oils of the kinds described, the steps of mixing dry calcium hypochlorite containing approximately 60% of available chlorine with the oil, maintaining the mixture at a temperature of about 70° to 75° C. for a period of approximately five to six hours, agitating the mixture throughout the period of heating, and adding to the treated oil a smaller quantity of tung oil treated in the same manner.

8. In the treatment of semi-drying and non-drying oils, the steps of adding to the oil dry calcium hypochlorite containing 60% of available chlorine to the amount of approximately 1.4% to 1.6% by weight of the oil, maintaining the mixture at a temperature of approximately 70° to 75° C. for a period of about five to six hours, and adding to the treated oil a lesser quantity of tung oil treated in substantially the same manner.

9. In the treatment of semi-drying and non-drying oils, the steps of adding to the oil dry calcium hypochlorite containing 60% of available chlorine to the amount of approximately 1.4% to 1.6% by weight of the oil, maintaining the mixture at a temperature of approximately 70° to 75° C. for a period of about five to six hours, and adding to the treated oil not to exceed 50% by volume of tung oil treated in substantially the same manner.

10. In the treatment of semi-drying and non-drying oils, the steps of adding to the oil dry calcium hypochlorite containing 60% of available chlorine to the amount of approximately 1.4% to 1.6% by weight of the oil, maintaining the mixture at a temperature of approximately 70° to 75° C. for a period of about five to six hours, and adding to the treated oil not to exceed 30% by volume of tung oil treated in substantially the same manner.

11. In the treatment of semi-drying and non-drying oils of the kinds described, the steps of mixing with the oil dry calcium hypochlorite containing 60% available chlorine in an amount of about 1.4% to 1.6% by weight of the oil, maintaining the mixture at a temperature of about 70° to 75° C. for about five to six hours, agitating the mixture throughout the period of heating, and adding to the treated oil not to exceed 50% by volume of tung oil similarly treated.

12. In the treatment of semi-drying and non-drying oils of the kinds described, the steps of mixing with the oil dry calcium hypochlorite containing 60% available chlorine in an amount of about 1.4% to 1.6% by weight of the oil, maintaining the mixture at a temperature of about 70° to 75° C. for about five to six hours, agitating the mixture throughout the period of heating, and adding to the treated oil not to exceed from 10% to 30% by volume of tung oil similarly treated.

In testimony whereof I affix my signature.

LORENZO D. TAYLOR.